United States Patent [19]
Masters

[11] 3,935,766
[45] Feb. 3, 1976

[54] METHOD AND APPARATUS FOR MACHINING CYLINDRICAL TUBES

[76] Inventor: Christopher F. Masters, 2525 South Shore Drive, Milwaukee, Wis. 53207

[22] Filed: Oct. 9, 1973

[21] Appl. No.: 404,542

[52] U.S. Cl................. 82/21 A; 82/14 D; 82/38 R; 90/13.5
[51] Int. Cl.²... B23B 21/00; B23B 3/28; B23C 1/16
[58] Field of Search............. 82/14, 14 D, 21, 21 A, 82/38, 39, 14 A; 29/568; 90/13.99, 13.5, 13 C, 13; 33/172 E, 174 PC, 172 R, 174 R, 181, 185

[56] References Cited
UNITED STATES PATENTS

| | | | |
|---|---|---|---|
| 2,681,595 | 6/1954 | LeCompte | 82/14 A |
| 2,927,258 | 3/1960 | Lippel | 90/13 C |
| 3,269,233 | 8/1966 | Lothmann | 90/13 C |
| 3,280,674 | 10/1966 | Sirola | 82/38 |
| 3,483,795 | 12/1969 | Wranowsky | 90/13.5 |
| 3,561,301 | 2/1971 | Sharp et al. | 82/21 R |
| 3,623,216 | 11/1971 | Aihara et al. | 29/568 |
| 3,704,641 | 12/1972 | Rhoades | 82/14 D |
| 3,834,256 | 9/1974 | Abbatiello et al. | 82/21 A |

Primary Examiner—Harrison L. Hinson
Attorney, Agent, or Firm—Henry C. Fuller

[57] ABSTRACT

A cylindrical tube having eccentric inner and outer cylindrical surfaces is rotated in a lathe about the axis of its outer cylindrical surface. The thickness of the tube at a relatively small spot is measured by an ultrasonic thickness gauge whose sensing portion is moved relatively slowly along the length of the tube as it rotates to cover substantially the entire surface of the tube along a helical measurement path. A tool bit is mounted adjacent to the sensing portion of the ultrasonic thickness gauge for machining the tube as it rotates. The tool bit is moved toward and away from the center of the tube by a feed screw which is driven by a servo motor. The servo motor is controlled in accordance with the output of the thickness gauge to control the depth of the cut made by the tool bit in direct proportion to the measured thickness of the tube wall adjacent to the tool bit, thereby reducing the eccentricity of the tube. An anti-gouge circuit automatically reduces the movement of the tool bit toward the tube when the measured thickness of the tube wall rises above a predetermined maximum thickness value.

13 Claims, 3 Drawing Figures

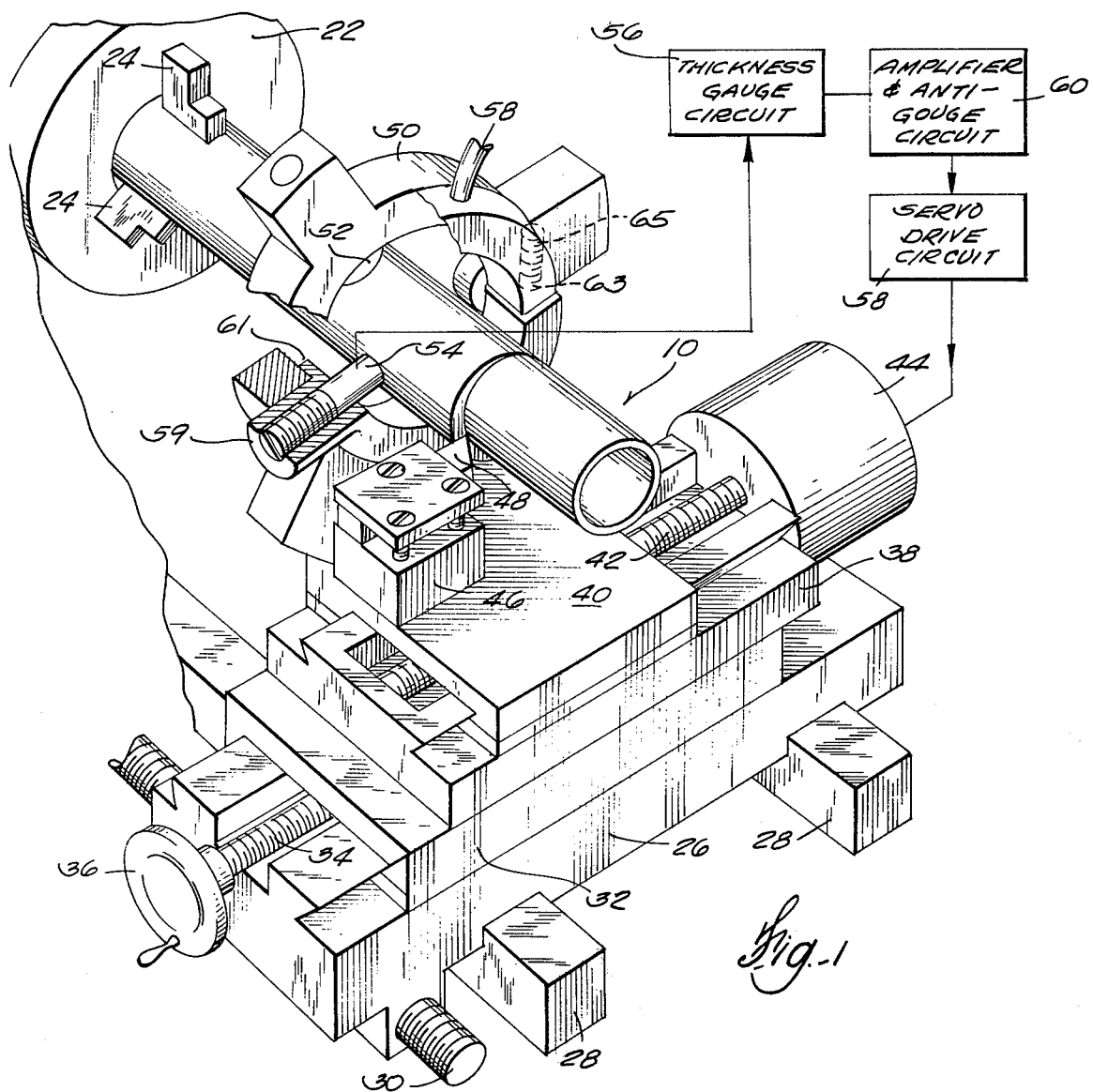
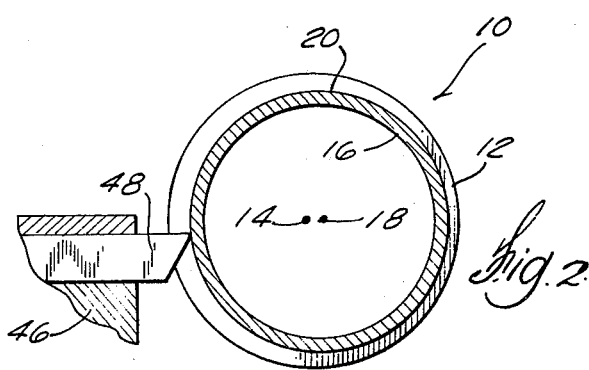

METHOD AND APPARATUS FOR MACHINING CYLINDRICAL TUBES

BACKGROUND OF THE INVENTION

In industrial applications that involve relatively long rotating tubes, e.g. tubes which have a large length to diameter ratio, a problem has been encountered in the past due to the eccentricity between the inner and outer cylindrical surfaces of the tube. When such tubes are rotated at relatively high speeds, the eccentricity between the inner and outer cylindrical surfaces of the tube causes relatively high levels of vibration which adversely affects the operation of the machine above speeds where the vibrations occur. Although machining techniques are available for achieving a satisfactory degree of concentricity in short tubes, these techniques are not applicable to tubes whose length to diameter ratio exceeds 10, and accordingly, a need exists for a machining technique which is capable of substantially reducing the eccentricity between the inner and outer cylindrical surfaces in such long tubes.

SUMMARY OF THE INVENTION

In accordance with this invention, the above noted need is met by a novel machining method which includes the steps of:

A. Rotating the tube about the axis of its outer cylindrical surface;
B. Providing a thickness gauge which is capable of measuring the wall thickness of a relatively small spot on the tube while it is rotating;
C. Moving the sensing portion of the thickness gauge relatively slowly along the length of the tube while it is rotating so as to measure the wall thickness of substantially all of the tube along a helical measurement path; and
D. Removing material from the tube wall adjacent to the spot where the tube wall thickness is being measured, the depth of material removed from the tube wall being equal to the measured tube wall thickness at the adjacent spot minus a constant offset, which offset equals the tube wall thickness after machining.

The apparatus of this invention includes means for rotating the tube about the axis of its outer cylindrical surface, a thickness gauge of the type which is capable of measuring the wall thickness of a relatively small spot on the tube while it is rotating and which produces an output signal whose magnitude is proportional to the tube wall thickness at that spot, means for mounting the sensing portion of the thickness gauge adjacent to the tube to measure the wall thickness of the tube as it rotates, machining means for removing material from the tube wall at a spot adjacent to the thickness gauge, means for simultaneously moving the sensing portion of the thickness gauge and the machining means along the length of the rotating tube to measure and machine the wall thereof along a helical path, and servo drive means coupled between the output of the thickness gauge and the machining means to control the depth of machining in direct proportion to the magnitude of the measured tube wall thickness.

Further objects, advantages and features of the invention will become apparent from the following disclosure.

DESCRIPTION OF THE DRAWINGS

FIG. 1 is a fragmentary perspective view and block diagram of one illustrative embodiment of the apparatus of the invention.

FIG. 2 is a cross-sectional view showing the noneccentric tube which is being machined in the apparatus of FIG. 1 and the tool bit which is machining the tube.

DESCRIPTION OF THE PREFERRED EMBODIMENT

Figure 3:
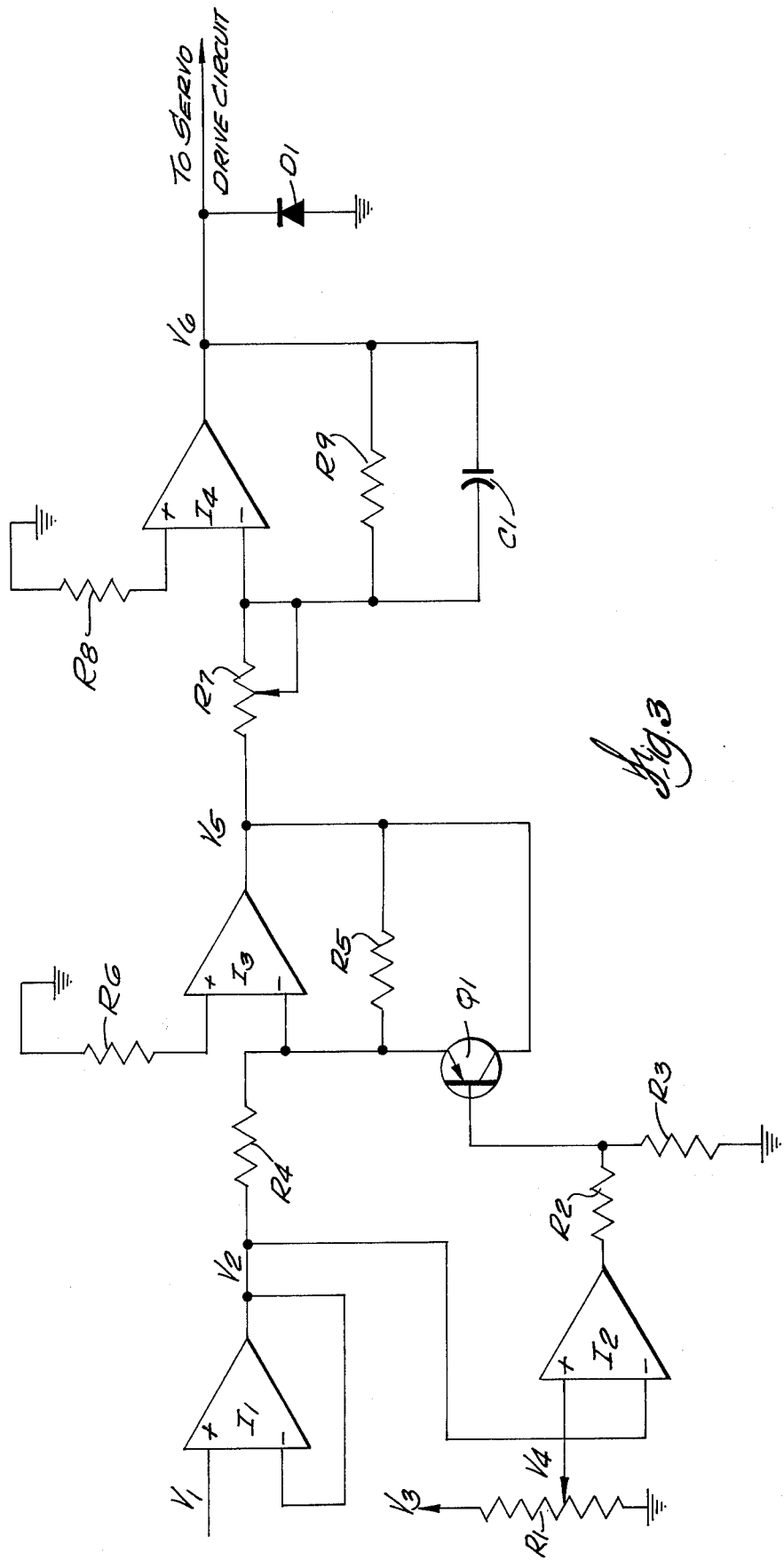
FIG. 3 is a schematic circuit diagram of one illustrative amplifier and anti-gouge circuit of this invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The method and apparatus of this invention are adapted to reduce the eccentricity of the inner and outer surfaces of relatively long tubes such as the tube 10 shown in FIGS. 1 and 2. Referring particularly to FIG. 2, the tube 10 has an outer cylindrical surface 12 whose central axis is indicated at point 14 and an inner cylindrical surface 16 whose central axis is indicated at point 18. The purpose of the method and apparatus of this invention is to machine a new outer cylindrical surface 20 which is more concentric with the inner cylindrical surface 16 than is the original outer cylindrical surface 12. This may be done with a lathe tool bit, a lathe milling machine, a cutting wheel or grinder, or any other suitable material removing apparatus. In the particular embodiment disclosed herein, a conventional lathe tool bit is used for the machining.

Referring to FIG. 1, the eccentric tube 10 is mounted for rotation within a lathe having a chuck 22 with jaws 24 for clamping the tube 10 for rotation about the axis 14 of its outer cylindrical surface 12. The lathe also contains a lathe carriage base 26 which is slideably mounted on lathe ways 28 and is moved therealong by means of a feed screw 30, which may be rotated either manually or automatically by conventional means not shown in the drawing. A lathe carriage saddle 32 is slideably mounted upon the lathe carriage base 26 for movement transverse of the lathe bed. The lathe carriage saddle 32 may be moved manually by means of a feed screw 34 which is controlled by a hand wheel 36. A servo slide base 38 is rigidly mounted on the lathe carriage saddle 32 and a servo saddle 40 is slideably mounted on the servo slide base 38 for movement transverse to the lathe carriage bed. The servo slide saddle 40 is moved transversely by means of a feed screw 42 which is moved by a servo motor 44. The feed screw 42 can be connected to the servo slide saddle by a ball nut assembly mounted on the slide. A conventional tool holder or support 46 is mounted on the servo slide saddle 40 and supports a conventional tool bit 48. The tool bit 48 may be moved toward and away from the center of the tube 10 by either the feed screw 34 or the feed screw 42. The feed screw 34 provides a manual adjustment for the tool bit 48 and the feed screw 42 provides a motor-driven adjustment for the tool bit 48 as will be explained hereinafter.

A lead rest 50 containing three rollers 52 is rigidly mounted to the lathe carriage base 26 for supporting the rotating tube 10 near the tool bit 48 to insure that the tube 10 rotates about the axis 14 of its outer cylindrical surface 12 and to support the tube 10 adjacent to the tool bit 48 to prevent chatter during the machining operation. The rollers 52 are spaced apart from each other by 120° around the periphery of the lead rest 50 and one of the rollers 52 is preferably aligned with the tool bit 48 on the opposite side of tube 10 so as to provide maximum rigidity of the tube when it is being cut by the tool bit 48.

The lead rest 50 and rollers 52 thereof slide along the outer cylindrical surface 12 of the tube 10 as the lathe carriage base 26 moves longitudinally along the lathe ways 28. In order for the tube 10 to properly slide along the rollers 52 it is necessary for the outer cylindrical surface 12 of the tube 10 to have adequate cylindricity and it has been found that adequate cylindricity for the surface 12 can be achieved by centerless grinding prior to installing the tube 10 in the lathe. In some operations with, for instance, a tube of considerable length, the tube may be periodically fed through the hole in the chuck and the machining repeated.

In order to continuously measure the wall thickness of the tube 10 as it rotates, the sensing or transducer portion 54 of an ultrasonic thickness gauge is mounted on the lead rest 50 as close as possible to the tool bit 48. The transducer portion 54 of the ultrasonic thickness gauge is coupled electrically to a thickness gauge circuit 56 which is operable to produce an electrical output signal indicating the thickness of the tube wall opposite the transducer 54.

The ultrasonic thickness gauge is a well known prior art thickness measuring instrument which sends ultrasonic waves through the wall of the tube and measures the thickness of the tube by measuring the time required for the ultrasonic waves to be reflected back from the inner surface of the tube. Since this thickness measurement is used as an indication of how much material is to be removed from the tube wall at that particular point, it is necessary to locate the ultrasonic transducer 54 as close to the tool bit 48 as possible. A coolant fluid conduit 58 is attached to the lead rest 50 with its open end terminating adjacent to the ultrasonic transducer 54 and the tool bit 48 for applying cutting tool coolant fluid to the rotating tube 10 immediately adjacent the ultrasonic transducer 54 and the tool bit 48. The cutting tool coolant fluid is supplied by a conventional source which is not illustrated in the drawings. In addition to cooling the tool bit 48, the coolant fluid also acts as a coupling medium for ultrasonically coupling the transducer 54 to the wall of tube 10.

The output of the thickness gauge circuit 56 is applied to a servo drive circuit 58 through an amplifier and anti-gouge circuit 60 whose function will be described hereinafter. The servo drive circuit 58 turns the servo motor 44 to an angular position which corresponds to the measured thickness of the tube wall 10 opposite the ultrasonic transducer 54. This turns the feed screw 42 for the servo slide saddle 40 and causes the tool bit 48 to be moved toward and away from the center of the rotating tube 10. As the tube 10 rotates, any change in the tube wall thickness at the point under the ultrasonic transducer will cause the cutting tool bit 48 to change position by precisely the same amount. An increase in tube wall thickness causes the cutting tool bit 48 to move in towards the tube center; and conversely a decrease in tube wall thickness causes the cutting tool bit 48 to move away from the tube. Assuming that there is no significant variation of tube wall thickness between the tool bit 48 and the ultrasonic transducer 54, the above described cutting action will produce an outer cylindrical surface 20 (See FIG. 2) which is more coaxial with the inner cylindrical surface 16 than is the original outer cylindrical surface 12.

The need for the anti-gouge circuit 60 is related to peculiarities of the ultrasonic thickness gauge. If the transducer should lose contact with the tube wall or the cutting tool coolant fluid should stop, thus removing any transmission medium between the ultrasonic transducer 54 and the outer surface 12 of the tube 10, this would cause the thickness indication of the thickness gauge circuit 56 to rise to a very large level, which in turn would cause the servo drive circuit to actuate the servo motor 44 to position the tool bit 48 to cut excessively or gouge the wall of tube 10. For this reason, it is desirable to reduce the output signal of the thickness guage circuit 56 whenever it rises above a predetermined maximum level so as to reduce the input to the servo drive circuit 58 and thus to prevent the tool bit 48 from being driven too deeply into the wall of tube 10. In this particular application of the invention, the anti-gouge circuit 60 is associated with an amplifier circuit which serves to transform the output signal of the ultrasonic thickness gauge circuit into a signal which is compatable with the input of the servo drive circuit 58 and also serves as an electronic filter to remove unwanted signals from the output of the thickness gauge 56.

One illustrative circuit for the amplifier and antigouge circuit is shown in the schematic diagram of FIG. 3. Referring to FIGS. 1 and 3, the output of the thickness gauge circuit 56 is an analogue voltage in this particular embodiment and is represented in the schematic of FIG. 3 as the voltage $V_1$ which is applied to the positive input terminal of an operational amplifier $I_1$ which is arranged in the standard voltage follower pattern. The output signal $V_2$ of amplifier $I_1$ is applied via resistor $R_4$ to the negative input terminal of an operational amplifier $I_3$ which is arranged as a fixed gain inverting amplifier stage. The output voltage $V_2$ is also applied to the negative input terminal of an operational amplifier $I_2$ which receives a manually adjustable voltage level $V_4$ on its positive input terminal.

$I_2$ is an operational amplifier which is operated so as to have its output fully saturated either in the plus or minus direction. If $V_2$ is less than $V_4$, the output of operational amplifier $I_2$ is a high positive voltage which is coupled through resistors $R_2$ and $R_3$ to the base of a transistor $Q_1$. The high positive voltage places transistor $Q_1$ in a cutoff condition and under these conditions the gain of the operational amplifier $I_3$ is approximately equal to $R_5$ divided by $R_4$. However, in the case where the voltage $V_2$ exceeds the voltage $V_4$, the output of operational amplifier $I_2$ becomes a large negative voltage which places the transistor $Q_1$ in the conductive state, thereby shorting out $R_5$ and making the gain of operational amplifier $I_3$ become very nearly zero. Thus it will be apparent that the voltage level $V_4$ is a manually adjustable reference level above with the level of the output signal of the circuit is drastically reduced. The voltage level $V_4$ is manually set at a level which is higher than the voltages normally encountered in the circuit so that the transistor $Q_1$ will only be turned on by a malfunction of the transducer 54 and will not be shorted out during the normal operation of the circuit.

The output signal $V_5$ of operational amplifier $I_3$ is applied through a variable resistor $R_7$ to the negative input of an operation amplifier $I_4$ which is connected to form a variable gain inverting amplifier. The purpose of the variable gain is to match the output voltage $V_5$ to the input range of the servo drive circuit 58. Capacitor $C_1$ is added in parallel with the amplifier $I_4$ to filter out frequencies which are higher than the rotational frequency of the tube 10. A diode $D_1$ prevents the output voltage $V_6$ from becoming negative.

It should be emphasized that the design of this interface amplifier and anti-gouging control depend entirely on the choice of ultrasonic thickness gauge and servo drive. If the output of the ultrasonic thickness circuit is a digital signal, or if the servo drive accepts digital signals, or if both the thickness gauge and the servo drive utilized digital signals, the design details would be entirely different. However, in any case, the interface amplifier would still serve the same three basic purposes of acting as a buffer, and as an anti-gouge circuit, and as a filter for rejecting unwanted signals and noise. Under ideal conditions the interface amplifier could be eliminated and only the anti-gouge circuit would then remain between the output of the thickness gauge circuit 56 and the input of the servo drive circuit 58. The circuit could also be operated without an anti-gouge circuit, although in this condition there would be the danger of ruining a tube 10 in case the ultrasonic transducer 54 is moved away from the tube 10 or in case the coolant fluid supply should fail.

The output voltage $V_6$ of the anti-gouge circuit and amplifier circuit 60 is applied to the input of the servo drive circuit 58 so as to turn the servo motor 44 in such a way that the total rotational displacement from some fixed angular position is proportional to the measured thickness of the tube 10 as measured by the ultrasonic transducer 54. The rotational position of the servo motor 44 is then converted into a linear position by the feed screw 42 and servo slide saddle 40. The entire system must be calibrated in such a way that an incremental increase or decrease in the measured tube wall thickness causes the same change in the linear position of the servo slide saddle 40. The direction of change must be such that if the measured thickness increases, the tool bit 48 will move toward the center of the tube 10; and, if the measured thickness decreases, the tool bit 48 will move away from the center of the tube 10.

One of the most important specifications for the servo drive is its frequency response. For a tube with a cylindrical inside and outside, let $R_O$ = the outside radius;
$R_i$ = the inside radius;
E = the eccentricity, or distance between the centerlines of the inside and outside cylindrical surfaces;
$f$ = the frequency at which the tube rotates; and
$t$ = time.

It then can be shown that the measured value of the thickness, defined as T, satisfies to a very good degree of approximation, $$T = (R_o - R_i) - E \cos(2\pi f t)$$

for the case where $E$ is no greater than 10 percent of $R_o$.

In essence, this means that the servo motor will oscillate in a pure sinusoidal pattern with the same frequency as the tube is rotating.

In order to determine the minimum frequency response of the servo drive circuit 58 and servo motor 44, one must determine the minimum speed at which the tube 10 must rotate and still be machined by the cutting tool 48. This determines the frequency response of the servo motor 44 and servo drive circuit 58. If desired, it is possible to mount a milling attachment or grinding attachment on the servo slide saddle 40 rather than a fixed tool bit 48. In this case, the tube 10 need not rotate at such high speed, and as a result, the frequency response of the servo drive motor 44 and servo drive circuit 58 can be reduced. However, for machining tubes of A.I.S.I. 4130 steel of 1½ inch nominal outside diameter, it has been found that the minimum speed at which these tubes can be rotated and still get a good lathe cutting action with a high speed steel tool bit was 2 Hz. There are many servo drives on the market today with a frequency response at least this high.

It should be pointed out that if the servo drive frequency response is limited solely by a phase lag (not by an amplitude cutoff) then the thickness transducer can be repositioned in the polar direction to compensate for this phase lag. In this regard, the transducer 54 can be supported in a split ring shaped holder 59 which has an axial extending flange 61 which interfits within the lead rest 50. A bolt 63 in a threaded aperture 65 expands the ring shaped holder to wedge the flange 61 in the lead rest to secure the transducer in the desired polar position with respect to the tube 10.

Turning the tube 10 at higher speeds with higher frequency response servo drives and motors will improve the cutting action, but care must be taken to insure that the thickness gauge is sampling thickness at a rate much faster than the tube rotational frequency. The particular ultrasonic thickness gauge used in the disclosed embodiment of the invention sampled the tube thickness at a 2 kilohertz rate. Since the tube was rotating at a rate of 2 hertz, this meant that the thickness measurement was being made every 0.36 degrees as the tube rotated. The accuracy of this ultrasonic thickness gauge is in the vicinity of 0.001 inches. This accuracy determines the ultimate limit of the machining process with this type of gauge. In many of the tubes which were machined with this embodiment of the invention, the variations in wall thickness in the prior direction were in the order of 0.030 inches. Accordingly, the type of thickness gauge employed could adequately measure these wall thickness variations.

In the operation of the above disclosed embodiment of the invention, the lead rest 50, the coolant liquid conduit tube 58, the ultrasonic transducer 54, and the tool bit 48 are all simultaneously moved relatively slowly toward the chuck 22 of the lathe by the feed screw 30 which is rotated by a conventional feed screw drive.

As the transducer 54 and tool bit 48 move relatively slowly along the length of the tube 10, the motor shaft of servo drive motor 44 is rotated from one angular position to another in accordance with the thickness measured by the ultrasonic thickness gauge circuit 56 so as to machine the surface of the tube 10 to provide a new outer surface 20 (see FIG. 2) which is more coaxial with the inner surface 16 of the tube 10 than was the original outer surface 12. The thickness of the tube wall portion which remains after the cutting operation is completed is determined by the manual setting of the lathe carriage saddle 32 made with the handle wheel 36 prior to beginning the machining operation.

In general terms, the method of this invention includes the steps of:

A. Premachining the tube to an acceptable level of cylindricity of 0.001 inch or less by centerless grinding or the like;

B. Rotating the tube 10 about the axis 14 of its outer cylindrical surface 12;

C. Providing a thickness gauge which is capable of measuring the tube wall thickness of a relatively small spot on the tube while it is rotating;

E. Removing material from the tube wall adjacent to the spot where the tube wall thickness is being measured, the depth of material removed from the tube wall being equal to the measured tube wall thickness at the adjacent spot minus a constant offset.

It will be appreciated that the method of this invention can be practiced with other apparatus than the apparatus shown in FIG. 1 and described above. For example, the tool bit 48 may be replaced by a milling cutter or a grinding wheel or any other suitable means for removing material from the tube adjacent to the ultrasonic transducer 54. Other modifications will be apparent to those skilled in the art, and it should be understood that this invention includes all modifications that fall within the scope of the following claims.

What is claimed is:

1. Apparatus for machining an elongated cylindrical tube having eccentric inner and outer cylindrical surfaces to reduce the eccentricity thereof, said apparatus comprising means for rotating the tube about the axis of its outer cylindrical surface, ultrasonic measuring means for measuring the wall thickness in a radial direction from the tube center of a relatively small spot on said tube prior to machining while it is rotating and said means producing an output signal whose magnitude is proportional to said tube wall thickness, said measuring means including a sensor, means for mounting said sensor adjacent to said tube, and externally of said tube at a fixed distance from the axis of rotation of said tube to measure the wall thickness of the tube as it rotates, machining means for removing material from said tube wall at a spot adjacent to said sensor, and subsequent to measuring the thickness of the wall at the spot, means for simultaneously moving said sensor and said machining means longitudinally along the length of said rotating tube to measure and machine the wall thereof along a helical path, and drive means coupled between the output of said measuring means and said machining means to move the machining means toward and away from the tube in a direction transverse to movement of the sensor to cause a depth of cut on the tube if required equal to the measured wall thickness minus a pre-selected final machined wall thickness thereby reducing the eccentricity of the inner and outer surfaces to the tube.

2. The apparatus defined in claim 1 wherein said means for rotating said tube about the axis of its outer surface comprises a lathe having a chuck clamped on the outer surface of said tube.

3. The apparatus defined in claim 2 and further comprising a lathe carriage base movably mounted on the bed of said lathe for movement toward and away from said chuck, and a lead rest rigidly mounted on said lathe carriage base, said lead rest having an annular opening in its central portion for receiving said tube and a plurality of rollers spaced around said annular opening for rollably engaging the outer surface of said tube, and said plurality of rollers being coaxial with said chuck to constrain said tube to rotation about the axis of its outer cylindrical surface.

4. The apparatus defined in claim 3 and further comprising a lathe carriage saddle movably mounted upon said lathe carriage base for sliding movement transverse to said tube, a servo slide base rigidly attached to said lathe carriage saddle, a servo slide saddly movably mounted on said servo slide base for sliding movement transverse to said tube, a servo slide feed screw threadably engaged with said servo slide saddle for moving the same transverse to said tube, said machining means being supported on said servo slide saddle, and said servo drive means including a servo motor mounted on said servo slide base and coupled to said servo slide feed screw for turning the same to move said machining means transverse to said tube by an amount proportional to the thickness measured by said thickness gauge.

5. The apparatus defined in claim 4 wherein said sensor comprises an ultrasonic transducer portion and wherein said transducer portion is mounted on said lead rest adjacent to said machining means, and wherein said transducer can be repositioned in the polar direction with respect to the tube center, and also comprising a source of cutting coolant fluid attached to said lead rest and positioned to apply coolant fluid to said tube adjacent to said thickness gauge transducer and to said machining means to cool the machining means and to ultrasonically couple the transducer to the outer surface of the rotating tube.

6. The apparatus defined in claim 5 and further comprising a lathe carriage base feed screw screwably engaged with said lathe carriage base for moving the same toward and away from said chuck, and a lathe carriage saddle feed screw screwably engaged with said lathe carriage saddle for moving the same transverse to said tube.

7. Apparatus for machining a cylindrical tube having eccentric inner and outer cylindrical surfaces to reduce the eccentricity thereof, said apparatus comprising means for rotating the tube about the axis of its outer cylindrical surface, measuring means for measuring the wall thickness of a relatively small spot on said tube while it is rotating and said means producing an output signal whose magnitude is proportional to said tube wall thickness, said measuring means including a sensor, means for mounting said sensor adjacent to said tube to measure the wall thickness of the tube as it rotates, means for repositioning said sensor in a polar direction from tube center, machining means for removing material from said tube wall at a spot adjacent to said sensor, means for simultaneously moving said sensor and said machining means along the length of said rotating tube to measure and machine the wall thereof along a helical path, and drive means coupled between the output of said measuring means and said machining means to control the depth of machining in accordance with the measured thickness of said tube, thereby reducing the eccentricity of the inner and outer surfaces of the tube, and further comprising an anti-gouge circuit coupled between the output of said thickness gauge and the input of said drive means, said anti-gouge circuit being operable to reduce the input signal to said drive means when the output of said thickness gauge exceeds a predetermined level to avoid gouging said tube.

8. The apparatus defined in claim 7 wherein said anti-gouge circuit comprises an operational amplifier which is connected as a fixed gain inverting amplifier and includes a feedback resistor coupled between the output terminal of said amplifier and the negative input terminal thereof, the output of said thickness gauge being coupled to the negative input terminal of said amplifier through a series resistor and the output of said amplifier being coupled to said servo drive means, and means coupled across said feedback resistor for shorting the feedback resistor when the output of said thickness gauge exceeds a predetermined level, thereby reducing the gain of said amplifier to zero when the output of said thickness gauge exceeds said predetermined level.

9. The apparatus defined in claim 8 wherein said means for shorting said feedback resistor comprises a transistor whose collector-emitter circuit is coupled in parallel with said feedback resistor and means for applying a saturation bias to the base of said transistor when the output of said thickness gauge exceeds said predetermined level.

10. The apparatus defined in claim 9 wherein the last mentioned means comprises a second operational amplifier whose output signal is coupled to the base of said transistor, the output signal of said thickness gauge being coupled to one input of said second operational amplifier, a manually variable d.c. voltage source being coupled to the other input of the second operational amplifier, the polarity of the inputs being arranged so that said transistor is cut off when the output of said thickness gauge is below the level of said variable d.c. voltage source and is saturated when the output of said thickness gauge is above the level of said variable d.c. voltage source.

11. The apparatus defined in claim 7 and further comprising a low pass filter for removing from the input signal all frequency components which are higher than the rotational frequency at said tube.

12. The apparatus defined in claim 7 and further comprising a diode shorted across the output of said antigouge circuit for removing output amplitude excursions of one polarity.

13. The apparatus defined in claim 11 wherein said second d.c. amplifier has a manually variable gain.

* * * * *

UNITED STATES PATENT OFFICE
CERTIFICATE OF CORRECTION

Patent No. 3,935,766      Dated February 3, 1976

Inventor(s) Christopher F. Masters

It is certified that error appears in the above-identified patent and that said Letters Patent are hereby corrected as shown below:

Column 7, line 51, change "to" to -- of --

Column 8, line 3, change "saddly" to -- saddle --

Signed and Sealed this

*fourth* Day of *May 1976*

[SEAL]

Attest:

RUTH C. MASON
*Attesting Officer*

C. MARSHALL DANN
*Commissioner of Patents and Trademarks*